(12) United States Patent
Cho et al.

(10) Patent No.: US 6,448,725 B1
(45) Date of Patent: Sep. 10, 2002

(54) APPARATUS FOR DETECTING ROTOR POSITION IN BRUSHLESS DIRECT CURRENT MOTOR

(75) Inventors: Kwan Yuhl Cho; Dong Myung Lee, both of Seoul (KR)

(73) Assignee: LG Electronics Inc., Seoul (KR)

( * ) Notice: Subject to any disclaimer, the term of this patent is extended or adjusted under 35 U.S.C. 154(b) by 75 days.

(21) Appl. No.: 09/680,213

(22) Filed: Oct. 6, 2000

(30) Foreign Application Priority Data

Jan. 18, 2000 (KR) .............................................. 00-2251
Jan. 18, 2000 (KR) .............................................. 00-2252
Jan. 18, 2000 (KR) .............................................. 00-2253

(51) Int. Cl.[7] .................................................. H02P 6/18
(52) U.S. Cl. ........................................ 318/254; 318/721
(58) Field of Search ............................... 318/138, 254, 318/439, 700, 720, 721, 722, 724

(56) References Cited

U.S. PATENT DOCUMENTS

| | | | | |
|---|---|---|---|---|
| 5,196,775 A | * | 3/1993 | Harris et al. | 318/638 |
| 5,202,613 A | * | 4/1993 | Kruse | 318/254 |
| 5,254,914 A | * | 10/1993 | Dunfield et al. | 318/254 |
| 5,982,133 A | * | 11/1999 | Murakami et al. | 318/650 |
| 6,218,795 B1 | * | 4/2001 | Syukuri | 318/254 |

* cited by examiner

*Primary Examiner*—Bentsu Ro
(74) *Attorney, Agent, or Firm*—Fleshner & Kim, LLP

(57) ABSTRACT

An apparatus for detecting a rotor position in a brushless direct current (BLDC) motor, in which a rotor position can be detected by a virtual neutral point voltage and current of one phase in a motor. The number of circuits required for the rotor position detection is reduced to save the production cost and reduce the space occupied by a position detecting circuit.

24 Claims, 16 Drawing Sheets

APPARATUS FOR DETECTING ROTOR POSITION IN BRUSHLESS DIRECT CURRENT MOTOR

BACKGROUND OF THE INVENTION

1. Field of the Invention

The present invention relates to a brushless direct current (BLDC) motor, and more particularly to an apparatus for detecting a rotor position in a BLDC motor.

2. Background of the Related Art

A BLDC motor has higher efficiency and is easier to be controlled than other motors. In this respect, the BLDC motor is generally used for variable speed driving of a compressor for refrigerator/air-conditioner and a washing machine.

To drive the BLDC motor, a flux of a stator should be controlled to be electrically orthogonal or have an angle with respect to a flux of a permanent flux from a rotor. To this end, a speed of the motor is controlled in such a manner that a position of a rotor is always detected and switching states of inverter switching elements are adjusted to determine a flux position of a stator in accordance with the detected rotor position. Accordingly, the configuration for detecting the rotor position is essential for the speed control of the BLDC motor.

Furthermore, a driving mode of the BLDC motor is divided into a rectangular current waveform and a sinusoidal current waveform depending on applied phase current.

A related art apparatus for detecting a rotor position of a BLDC motor will be described with reference to the accompanying drawings.

FIG. 1 shows a speed control device of a related art BLDC motor. Referring to FIG. 1, the speed control device includes a BLDC motor 1, a rotor position detector 2, a speed detector 3, a subtracter 4, a speed controller 5, a voltage controller 6, and an inverter 7. The rotor position detector 2 detects a phase of a voltage applied to the inverter 7, which is output to a BLDC motor, so as to detect the rotor position. The speed detector 3 detects a driving speed of the BLDC motor 1 by a signal detected by the rotor position detector 2. The subtracter 4 subtracts a speed detecting signal input from the speed detector 3 from a speed command input from a driving controller (not shown) to obtain a speed error. The speed controller 5 outputs a voltage command (voltage size) of the speed error output from the subtracter 4. The voltage controller 6 determines switching time of the inverter 7 by the signal from the rotor position controller 2 and the voltage command from the speed controller 5. The inverter 7 outputs direct current as a voltage of a variable frequency to correspond to the switching time determined by the voltage controller 6. The BLDC motor 1 is driven by the voltage from the inverter 7.

The operation of the aforementioned related art speed control device of the BLDC motor will be described below.

In a two-phase conducting mode in which current occurs only in a period of 120°, a speed command output from a driving controller (not shown) and a speed detecting signal $\omega_r$ detected by the speed detector 3 are subtracted from the subtracter 4, and the resultant value, i.e., the speed error is output to the speed controller 5.

The speed detecting signal $\omega_r$ from the speed detector 3 is calculated by the output of the rotor position detector 2. An encoder or a hall sensor is used as the rotor position detector 2. The rotor position detector 2 the rotor position of the BLDC motor 1 and outputs the detected value to the speed detector 3 and the voltage controller 6.

Subsequently, the speed controller 5 outputs the voltage signal (voltage command), which corresponds to the speed error output from the subtracter 4, to the voltage controller 6.

The voltage controller 6 determines switching state of the inverter 7 in accordance with the voltage signal output from the speed controller 5 to control the speed.

At this time, the encoder or the hall sensor may be used as the rotor position detector 2. In case of the compressor for refrigerator/air-conditioner, it is difficult to use the sensor due to environmental factors such as temperature and pressure. Accordingly, it is necessary to the rotor position from a voltage or current applied to the motor.

In the driving waveforms, the rectangular current waveform permits the rotor position to be detected from a phase voltage in a region to which voltage or current is not applied. In other words, the rotor position can be detected per electrical angle of 60° by detecting the point where the phase voltage of the open phase to which voltage or current is not applied becomes zero.

However, in the sinusoidal current waveform, voltage or current is always applied to three phases of A, B and C regardless of the rotor position. Accordingly, in the same manner as the rectangular current waveform, the rotor position cannot be detected with the voltage information of the open phase. Thus, the rotor position can be detected by detecting all the voltages or current of the three phases of A, B and C.

As shown in FIG. 3, the rotor position detector 2 for detecting the rotor position without using the sensor includes a current detector 51, a voltage detector 52, a first position detector 53, a second position detector 54, and a third position detector 55. The current detector 51 detects current of each phase from a predetermined alternating current voltage of each phase output from the inverter 7. The voltage detector 52 detects a voltage of each phase from a predetermined alternating current voltage of each phase output from the inverter. The first position detector 53 detects the rotor position in accordance with the current of the phase A detected by the current detector 51 and the voltage of the phase A detected by the voltage detector 52. The second position detector 54 detects the rotor position in accordance with the current of the phase B detected by the current detector 51 and the voltage of the phase B detected by the voltage detector 52. The third position detector 55 detects the rotor position in accordance with the current of the phase C detected by the current detector 51 and the voltage of the phase CA detected by the voltage detector 52.

Each of the first to third position detectors 53, 54 and 55 includes a first integrator 71 for integrating current of a virtual neutral point for each phase output from the current detector 51, a second integrator 72 for integrating a voltage of a virtual neutral point for each phase output from the voltage detector 52, a mixer 73 for mixing a signal output from the second integrator 72, an operation signal of a signal output from the first integrator 71 and a proportional coefficient R, and an operation signal of the current of one phase among the phases and a proportional coefficient L with one another, and a comparator 74 for comparing a signal output from the mixer 73 with a predetermined signal and outputting the resultant value.

The operation of the aforementioned rotor position detector 2 will be described below.

The predetermined alternating current voltage as shown in FIG. 2 is supplied from the inverter 7 to the respective phases A, B and C of the stator of the BLDC motor. A predetermined power is generated in the BLDC motor 1 in accordance with the predetermined alternating current voltage for each phase output from the inverter 7.

The rotor position detector 2 detects the rotor position of the BLDC motor 1 in accordance with the predetermined alternating current voltage for each phase output from the inverter 7 and outputs the resultant signal.

In other words, the current detector 51 within the rotor position detector 15 detects current for each phase from the predetermined alternating current voltage for each phase output from the inverter 7, and the voltage detector 52 detects the voltage for each phase from the predetermined alternating current voltage for each phase output from the inverter 7.

The first position detector 53 detects the rotor position in accordance with the current for the phase A detected by the current detector 51 and the voltage for the phase A detected by the voltage detector 52. That is, the first integrator 71 within the first position detector 53 integrates the current for the virtual neutral point of each phase output from the current detector 51. The second integrator 72 integrates the voltage for the virtual neutral point of each phase output from the voltage detector 52. The mixer 73 mixes the signal output from the second integrator 72, the operation signal of the signal output from the first integrator 71 and the proportional coefficient R, and the operation signal of the current of the phase A and the proportional coefficient L, and outputs the resultant signal. The comparator 74 compares the signal output from the mixer 73 with the predetermined signal and outputs the resultant signal.

The second position detector 54 detects the rotor position in accordance with the current for the phase B detected by the current detector 51 and the voltage for the phase B detected by the voltage detector 52. That is, the first integrator 71 within the second position detector 54 integrates the current of each phase output from the current detector 51. The second integrator 72 integrates the voltage of each phase output from the voltage detector 52. The mixer 73 mixes the operation signal of the signal output from the first integrator 71 and the proportional coefficient R, the signal output from the second integrator 72, and the operation signal of the current of the phase B and the proportional coefficient L, and outputs the resultant signal. The comparator 74 compares the signal output from the mixer 73 with the predetermined signal and outputs the resultant signal.

Also, the third position detector 55 detects the rotor position in accordance with the current for the phase C detected by the current detector 51 and the voltage for the phase C detected by the voltage detector 52. That is, the first integrator 71 within the third position detector 55 integrates the current of each phase output from the current detector 51. The second integrator 72 integrates the voltage of each phase output from the voltage detector 52. The mixer 73 mixes the operation signal of the signal output from the first integrator 71 and the proportional coefficient R, the signal output from the second integrator 72, and the operation signal of the current of the phase C and the proportional coefficient L, and outputs the resultant signal. The comparator 74 compares the signal output from the mixer 73 with the predetermined signal and outputs the resultant signal.

The principle for detecting the rotor position of the BLDC motor will be modeled as the following equation.

[equation 1]

$$V_{abc} = R \cdot i_{abc} + L\frac{di_{abc}}{dt} + e_{abc}$$

$$V_{abc}=[V_{an}\ V_{bn}\ V_{cn}]^T e_{abc}=[e_a\ e_b\ e_c]^T i_{abc}=[i_a\ i_b\ i_c]^T \quad \text{[equation 1]}$$

In the above equation, $V_{abc}$ represents each phase voltage of three phases A, B and C for the neutral point, $i_{abc}$ represents a phase reluctance matrix of three phases A, B and C, R represents a phase reluctance matrix for the three phases A, B and C, L represents a phase inductance matrix for the three phases A, B and C, and $e_{abc}$ represents a voltage in each phase.

In a permanent magnet surface adhesive type BLDC motor in which a permanent magnet is attached to a core of a rotor, reluctance is not changed depending on the rotor position. Accordingly, $L_a=L_b=L_c$ is obtained.

In the above equation, the phase voltage $e_{abc}$ is proportional to the speed of the motor as shown in the following equation 2 and is a function which is converted to a sinusoidal wave in accordance with the rotor position, as shown in FIG. 4.

$$e_a = k_e\ \omega_\gamma \cos(\theta_\gamma) \quad \text{[equation 2]}$$

$$e_b = k_e\omega_\gamma \cos\left(\theta_\gamma - \frac{2\pi}{3}\right)$$

$$e_c = k_e\omega_\gamma \cos\left(\theta_\gamma + \frac{2\pi}{3}\right)$$

Since the voltage $e_{abc}$ includes rotor position information, the rotor position can be detected from the information of the voltage.

However, in case where the current of the motor is controlled by the sinusoidal wave, the voltage $e_{abc}$ cannot be detected. Accordingly, the voltage should be inferred from the equation 1. In the equation 1, the voltage can be expressed as the following equation 3 but it is difficult to realize the equation 3 in a circuit or algorithm because a differential term of the current exists in the equation 3. Thus, the voltage is obtained by integrating both sides as shown in the following equation 4.

[equation 3]

$$e_{abc} = V_{abc} - R \cdot i_{abc} - L\frac{di_{abc}}{dt}$$

[equation 4]

$$\int e_{abc}\,dt = \int \left(V_{abc} - R \cdot i_{abc} - L\frac{di_{abc}}{dt}\right)dt$$

$$= \int V_{abc}\,dt - R\int i_{abc}\,dt - Li_{abc}$$

$$= x_{abc}(t)$$

Here, an integrated value of the voltage can be expressed from the equation 2 to the following equation 5. Accordingly, the rotor position can be detected from the integrated value of the voltage obtained by the equation 4.

[equation 5]

$$x_{abc}(t) = \int e_{abc} dt$$
$$= \left[ k_e \sin(\theta_y) k_e \sin\left(\theta - \frac{2\pi}{3}\right) k_e \sin\left(\theta_y + \frac{2\pi}{3}\right) \right]^T$$

As described above, the rotor position detector 2 detects the point 0 from the signal of the voltage integrated for each phase of the phases A, B and C, so that the rotor position can be detected.

However, the related art apparatus for detecting a rotor position in a BLDC motor has several problems.

To detect the rotor position, the voltages and the current for the phases A, B and C should be detected. In this case, additional equipments for detecting the phase voltages and phase current, such as a resistor and an insulator, are required, thereby increasing the production cost.

Furthermore, devices such as an integrating circuit and a comparator are required to obtain integrated values for the voltages and current signals of the phases A, B and C. This also increases the production cost and an area occupied by the devices.

SUMMARY OF THE INVENTION

Accordingly, the present invention is directed to an apparatus for detecting a rotor position in a BLDC motor that substantially obviates one or more of the problems due to limitations and disadvantages of the related art.

An object of the present invention is to provide an apparatus for detecting a rotor position in a BLDC motor, in which a rotor position can be detected by only a virtual neutral point voltage and current of one phase in a motor.

Another object of the present invention is to provide an apparatus for detecting a rotor position in a BLDC motor, in which the number of circuits required for the rotor position detection is reduced to save the production cost and reduce an area occupied by a position detecting circuit.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an apparatus for detecting a rotor position in a BLDC motor includes: a first integrator for integrating a signal input through a virtual neutral point of power supply lines of three phases connected to the BLDC motor; a second integrator for integrating a signal input to the power supply line of one phase among the power supply lines of the three phases; an operation unit for mixing a signal output from the first integrator, an operation signal of a signal output from the second integrator and a proportional coefficient R, and an operation signal of a proportional coefficient L and current of the one phase; a first compararison unit for comparing a signal of the one phase output from the operation unit with a predetermined first reference value; a second comparison unit for comparing the signal of the one phase output from the operation unit with predetermined second and third reference values; and a position signal calculator for calculating a position signal by operating signals output from the first and second comparison units.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

An apparatus for detecting a rotor position in a BLDC motor according to the present invention will be described with reference to the preferred embodiments of the present invention.

First Embodiment

Figure 1:
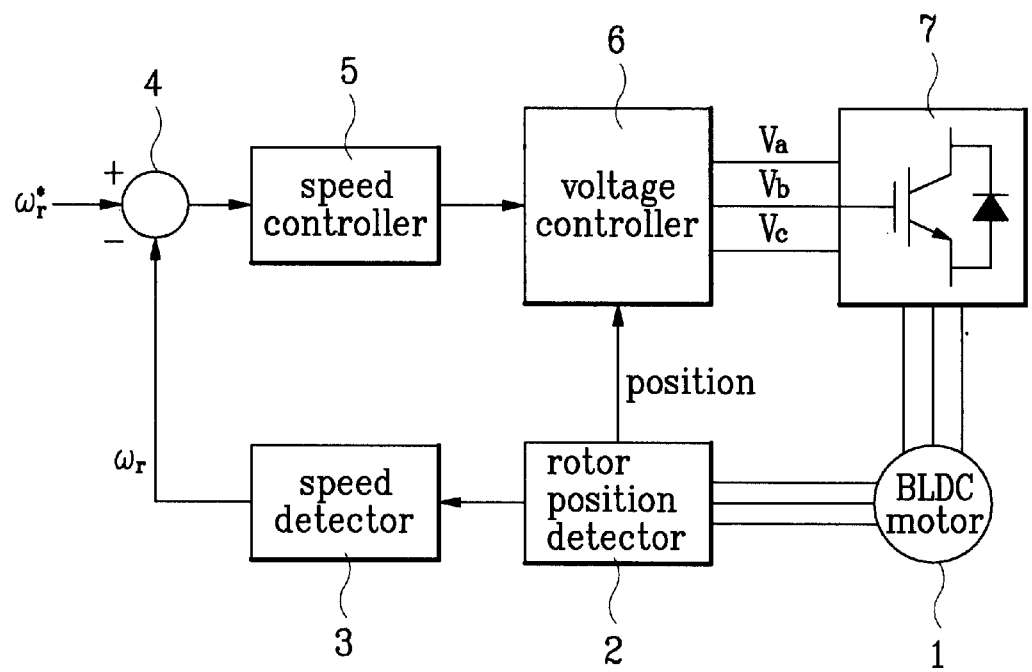
FIG. 1 shows a rotor position detector of a related art BLDC motor.
Figure 2:
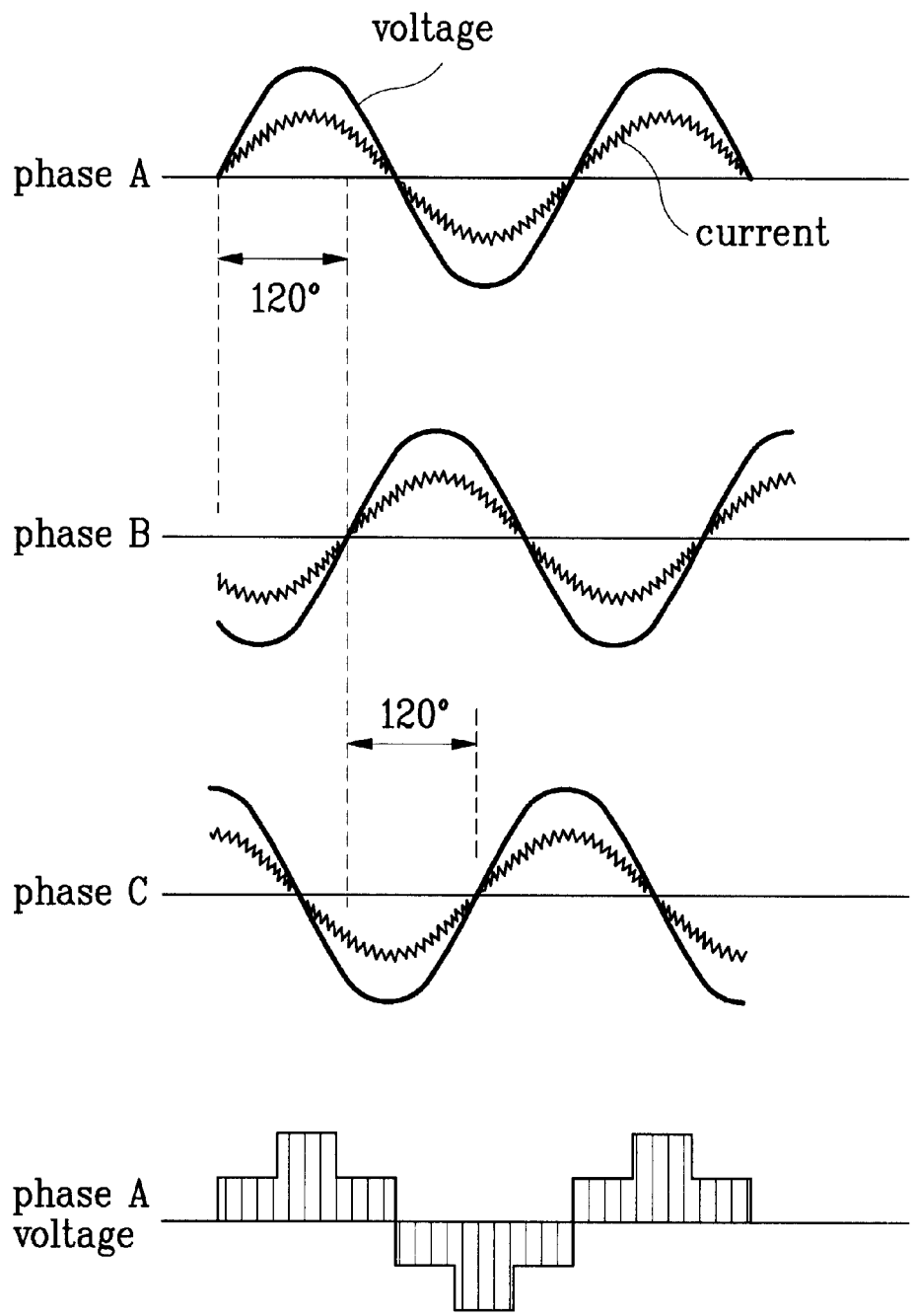
FIG. 2 shows waveforms of voltages and current during driving a sinusoidal wave current of FIG. 1.
Figure 3:
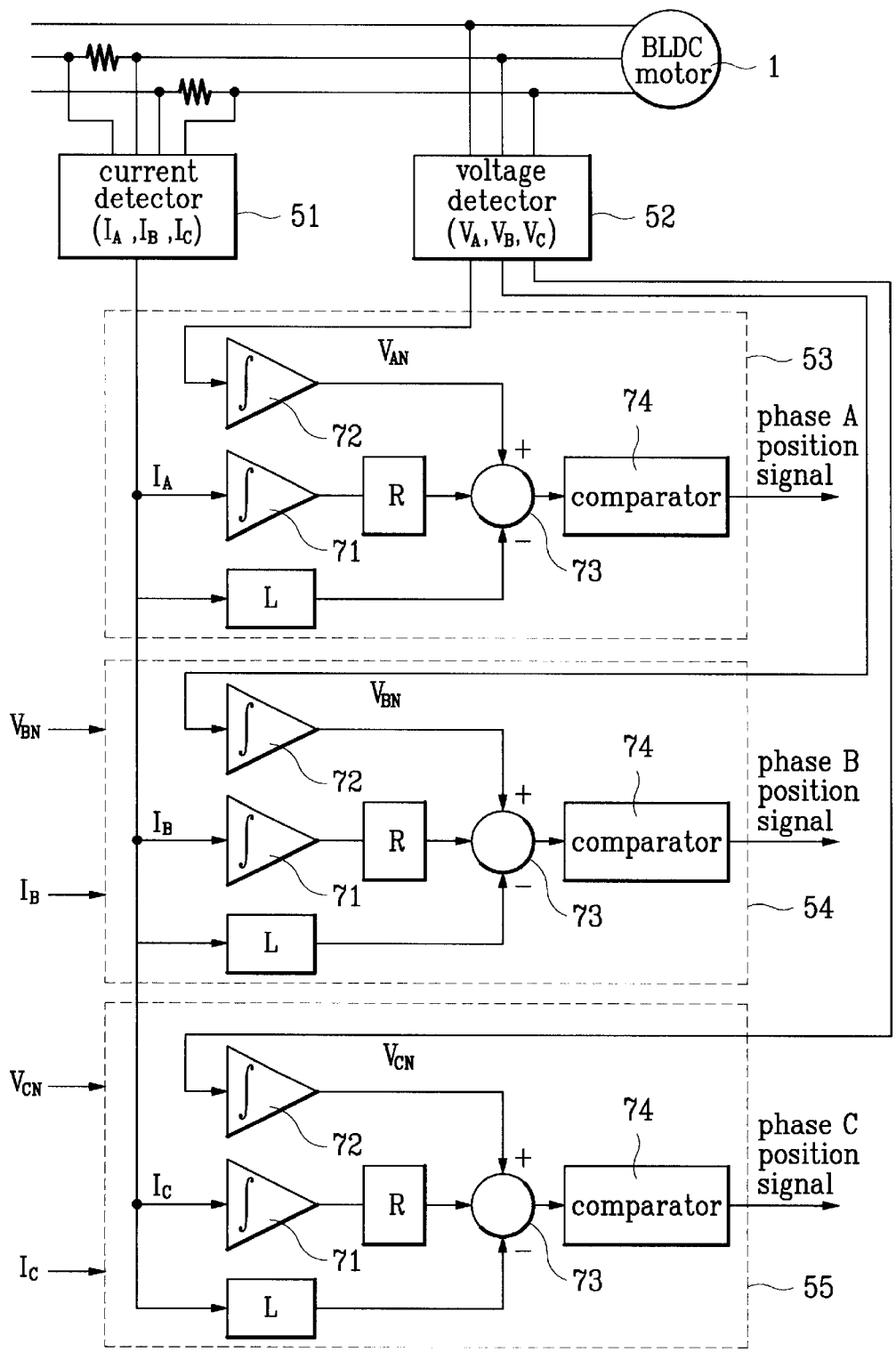
FIG. 3 shows a detailed configuration of the rotor position detector of FIG. 1.
Figure 4:
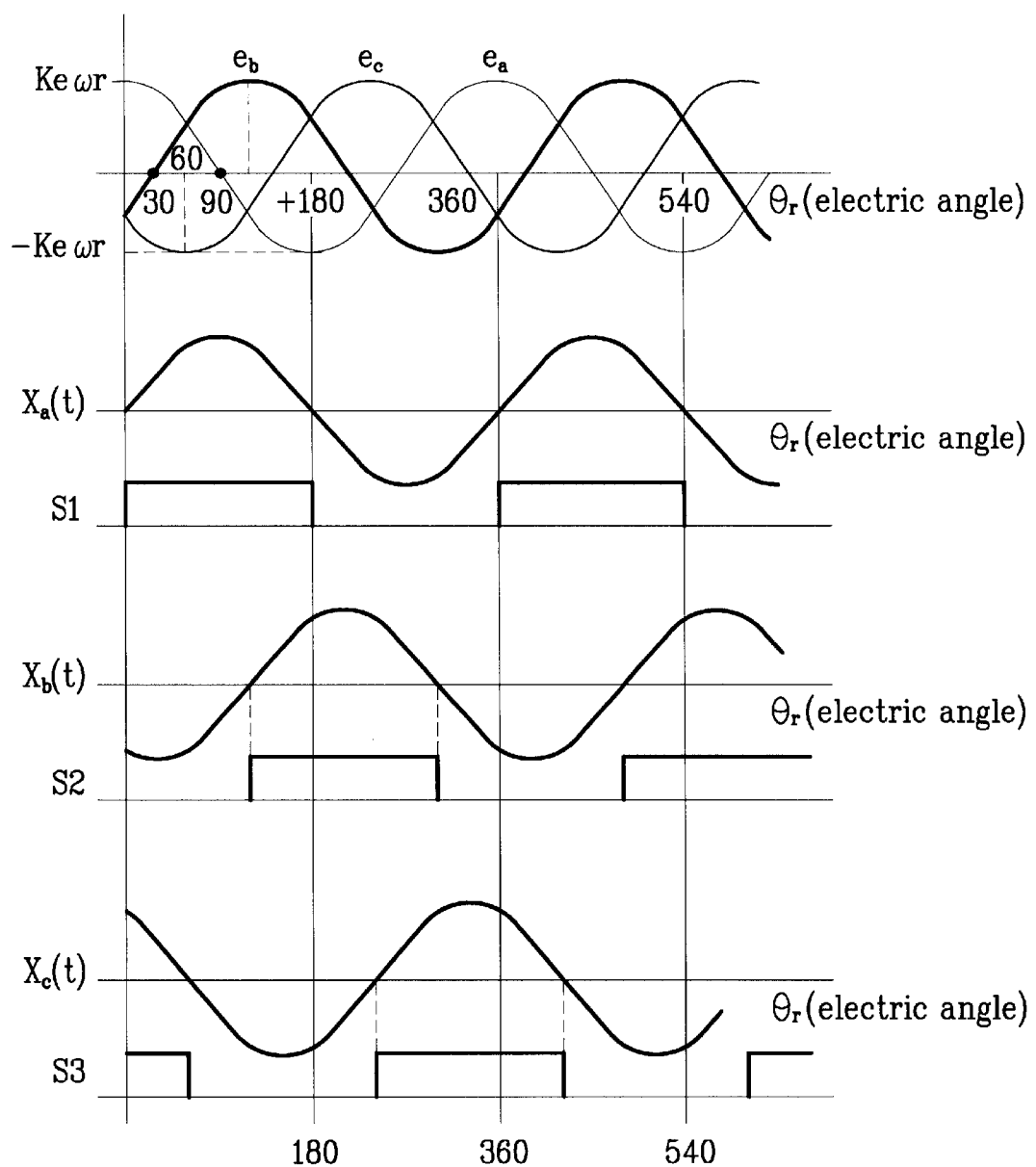
FIG. 4 shows waveforms of respective elements of FIG. 3.
Figure 5:
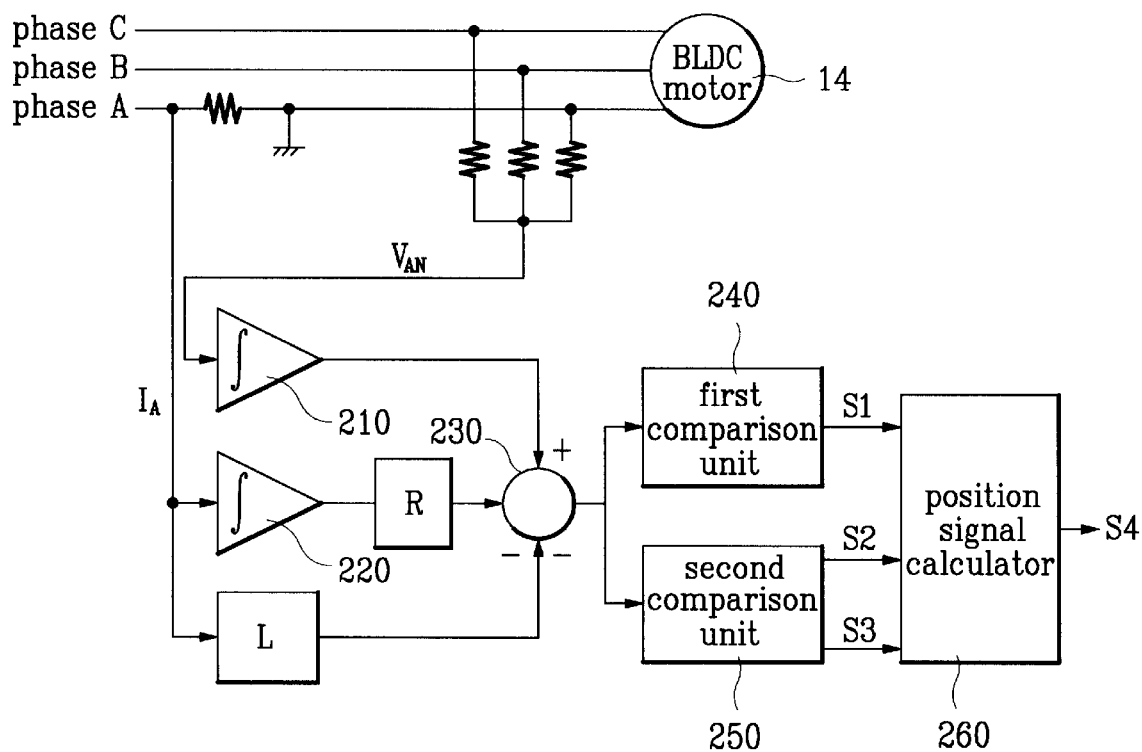
FIG. 5 shows a rotor position detector of a BLDC motor according to the first embodiment of the present invention.

As shown in FIG. 5, an apparatus for detecting a rotor position in a BLDC motor according to the first embodiment of the present invention includes a first integrator 210 for integrating a voltage of one phase for virtual neutral points of three phases, a second integrator 220 for integrating current of the one phase among the three phases, an operation unit 230 for mixing a signal output from the first integrator 210, an operation signal of a signal output from the second integrator and a proportional coefficient R, and an operation signal of a proportional coefficient L and current of the one phase, a first comparison unit 240 for comparing the signal of the one phase output from the operation unit 230 with a predetermined first reference value, a second comparison unit 250 for comparing the signal of the one phase output from the operation unit 230 with predetermined second and third reference values, and a position signal calculator 260 for calculating a position signal by operating signals output from the first and second comparison units 240 and 250.

Figure 6A:
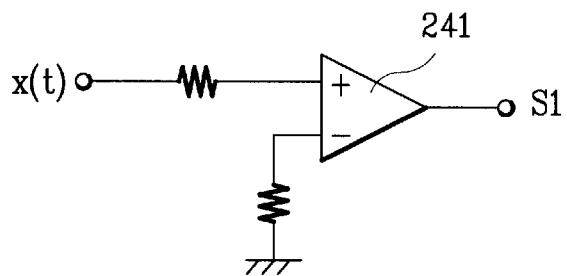
FIGS. 6a to 6c show detailed configurations of a first comparison unit, a second comparison unit and a position signal calculator of FIG. 5.
Figure 6B:
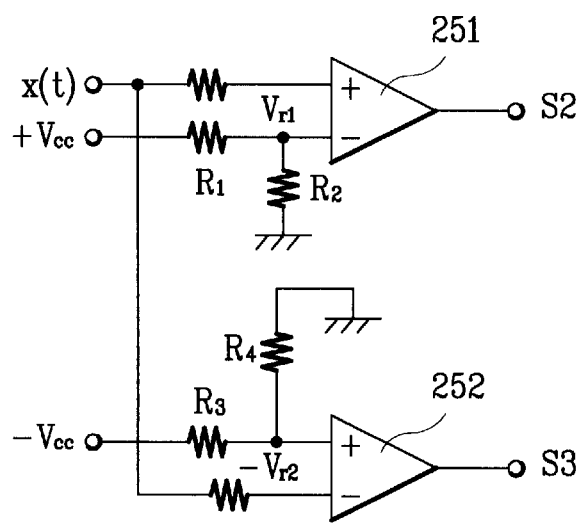
Figure 6C:
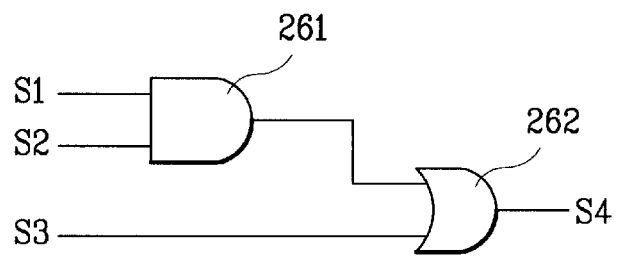

As shown in FIG. 6a, the first comparison unit 240 includes a first comparator 241 for comparing the signal of the one phase output from the operation unit 230 with the predetermined first reference value. As shown in FIG. 6b, the second comparison unit 250 includes a second comparator 251 for comparing the signal of the one phase output from the operation unit 230 with the predetermined second reference value, and a third comparator 252 for comparing the signal of the one phase output from the operation unit 230 with the predetermined third reference value. Also, as shown in FIG. 6c, the position signal calculator 260 includes a first AND gate 261 for performing logic AND operation of a signal output from the first comparator 241 and a signal output from the second comparator 251, and a first OR gate 262 for performing logic OR operation of a signal output from the first AND gate 261 and a signal output from the third comparator 252.

In the aforementioned embodiment of the present invention, the rotor position is detected by only a voltage of any one among the three phases A, B and C. For example, a model equation of the phase A can be expressed by the following equation 6. From the equation 6, the voltage $e_a$ is obtained, and then information of the phase A which is variable depending on the position regardless of speed can be obtained by integrating the voltage ea as shown in the following equation 7.

[equation 6]

$$v_{an} = R \cdot i_a + L\frac{di_a}{dt} + e_a$$

[equation 7]

$$\int e_a dt = \int \left(v_{an} - R \cdot i_a - L\frac{di_a}{dt}\right) dt$$
$$= \int v_{an} dt - R\int i_a dt - L \cdot i_a$$
$$= x_a(t)$$
$$= k_e \sin(\theta_\gamma)$$

The first integrator 210 integrates the voltage of the virtual neutral point and outputs the resultant signal.

The second integrator 220 integrates the current of the one phase and outputs the resultant signal.

Figure 7:
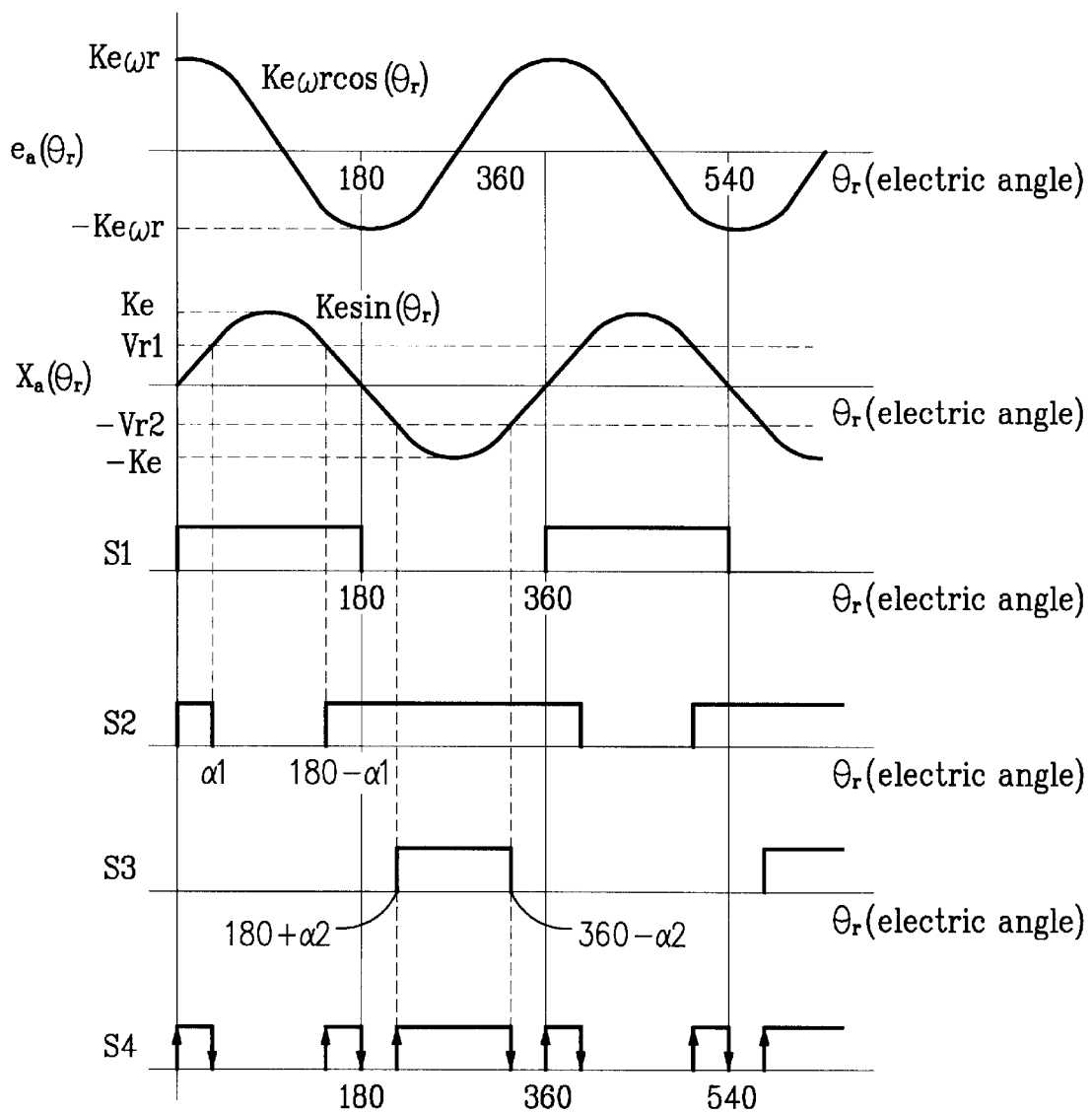
FIG. 7 shows position detecting waveforms in any angle of FIG. 5.

The operation unit 230 mixes the signal output from the first integrator, the operation signal of the signal output from the second integrator and the proportional coefficient R, and the operation signal of the proportional coefficient L and current of the one phase. Then, as shown in FIG. 7, the operation unit 230 outputs $k_e \sin(\theta_\gamma)$.

The first comparison unit 240 compares the signal of the one phase output from the operation unit 230 with the first reference value and outputs the resultant signal S1. That is to say, the first comparator 241 of the first comparison unit 240 compares the signal of the one phase output from the operation unit 230 with the first reference value of the zero potential predetermined by a pull-up resistor. Then, the first compartor 241 outputs the resultant signal S1.

Furthermore, the second comparison unit 250 compares the signal of the one phase output from the operation unit 230 with the second and third reference values, respectively. Then, the second comparison unit 250 outputs the resultant signals S2 and S3 as shown in FIG. 7. That is to say, the second comparator 251 of the second comparison unit 250 compares the signal of the one phase output from the operation unit 230 with the second reference value predetermined by voltage division of resistors R1 and R2. Then, the second compartor 251 outputs the resultant signal S2. Also, the third comparator 252 of the second comparison unit 250 compares the signal of the one phase output from the operation unit 230 with the third reference value predetermined by voltage division of resistors R3 and R4. Then, the third compartor 252 outputs the resultant signal S3.

If the second and third reference values are $V_{\gamma 1}$ and $-V_{\gamma 2}$, cross angles $\alpha_1$ and $\alpha_2$ are obtained as the following equation 8 and the reference values $V_{\gamma 1}$ and $-V_{\gamma 2}$ should be smaller than the voltage constant $k_e$.

[equation 8]

$$\alpha_1 = \sin^{-1}\left(\frac{V_{\gamma 1}}{K_e}\right)$$

$$\alpha_2 = \sin^{-1}\left(\frac{V_{\gamma 2}}{K_e}\right)$$

If the reference voltage values of the second comparison unit 250 are $V_{\gamma 1}$ and $-V_{\gamma 2}$, six position data can electrically be obtained for one period (electric angle 360°).

In other words, the output of the first comparison unit 240, the signal S1 of 0° and 180°, and the outputs of the second comparison unit 250, the signal S2 of $\alpha_1$ and 180−$\alpha_1$ and the signal S3 of 180+$\alpha_2$ and 360−$\alpha_2$ are available. The speed of the BLDC motor 14 can be controlled by various PWM methods by selecting $\alpha_1$ and $\alpha_2$.

Meanwhile, in practical application, to facilitate uniform position information detection and PWM control algorithm depending on the rotor position, it is necessary to adjust the reference voltage of the second comparison unit 250.

In other words, supposing that $V_{\gamma 1}=V_{\gamma 2}=V_\gamma=\sqrt{3}k_e/2$, the cross angle $\alpha$ among the integrated value $x_a(t)$ of the voltage and the reference voltages $V_{\gamma 1}$ and $-V_{\gamma 2}$ of the second comparison unit 250 can be expressed as follows.

[equation 9]

$$\alpha = \sin^{-1}\left(\frac{\sqrt{3}}{2}k_e/k_e\right)$$
$$= \sin^{-1}\left(\frac{\sqrt{3}}{2}\right) = 60°$$

In this case, the position signal calculator 260 operates the signals output from the first and second comparison units 240 and 250 and calculates the position signal so as to output the resultant signal S4.

In other words, the first AND gate 261 of the position signal calculator 260 performs logic AND operation of a signal output from the first comparison unit 240 and a signal output from the second comparison unit 250, and outputs the resultant signal. Then, the first OR gate 262 of the position signal calculator 260 performs logic OR operation of a signal output from the first AND gate 261 and a signal output from the second comparison unit 250, and outputs the resultant signal S4.

Figure 8:
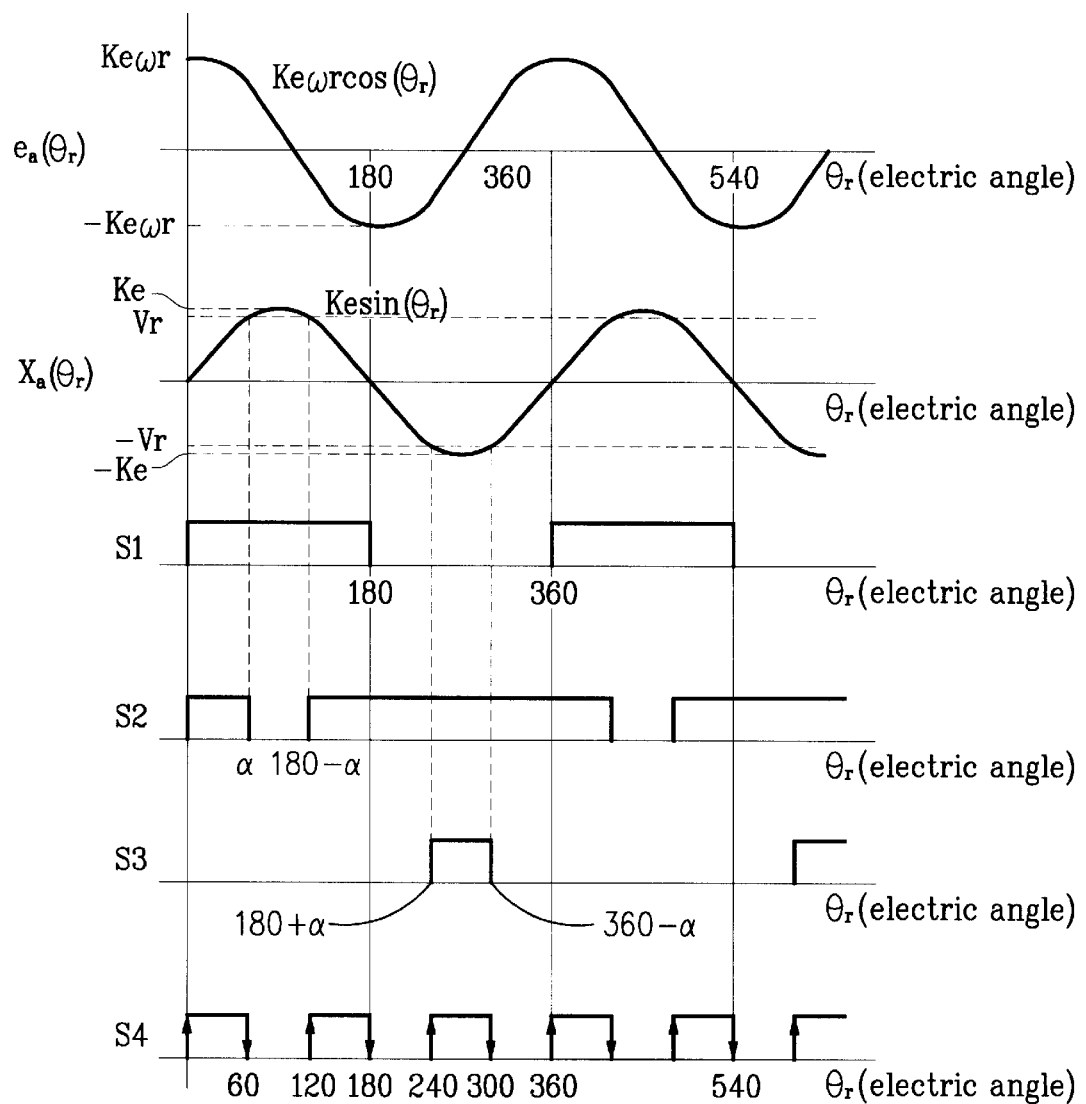
FIG. 8 shows position detecting waveforms in view of 60° of FIG. 5.

Furthermore, as shown in FIG. 8, the position signal calculator 260 detects the rotor position signal applied to the BLDC motor 14 for each unit of 60°. Based on rotor position information detected for each unit of 60°, various PWM methods for controlling the phase current of the BLDC motor to obtain a sinusoidal wave may be provided. As an example, a PWM method as shown in FIG. 9 may be provided.

In other words, to control the current of the phase A to obtain the sinusoidal wave, a reference voltage of the phase A during one period (360°) is compared with a triangular wave. Thus, a transistor on/off signal of the inverter 7 corresponding to the phase A is calculated in advance depending on the rotor position and stored in a look-up table, so as to generate a PWM signal. Alternatively, the PWM signal may be generated by directly calculating the transistor on/off signal from the equation of the PWM signal depending on the rotor position for a reference torque.

However, although the position signal calculator 260 can detect the rotor position for each unit of 60° but cannot detect the rotor position within 60°. That is to say, the position signal calculator 260 can detect the rotor position signal if the rotor is in 0° and 60° from the reference position. However, the position signal calculator 260 cannot detect the rotor position between 0° and 60° such as 20° or 35°.

Figure 9:
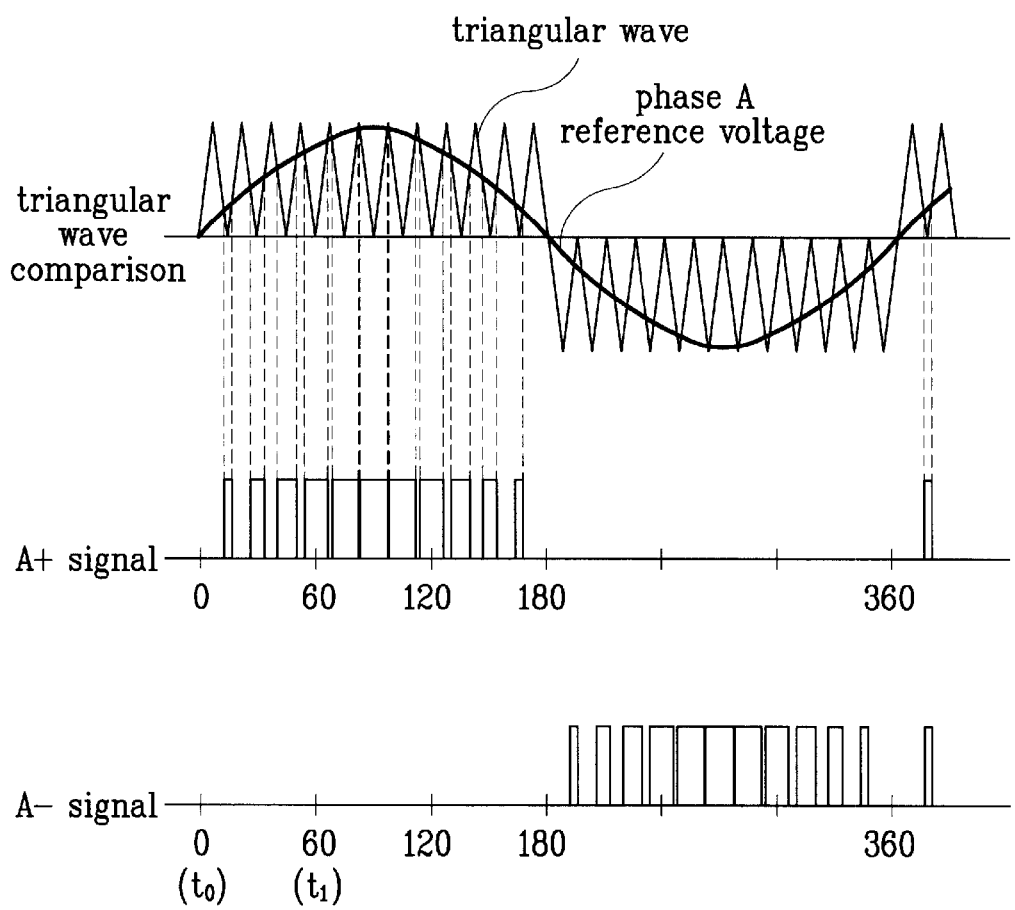
FIG. 9 shows waveforms of a pulse width modulation (PWM) signal depending on the rotor position of FIG. 5.

However, as shown in FIG. 9, since information for a position angle between 0° and 60° is required to generate the actual PWM signal, the position signal calculator 260 approximately calculates a position angle between 0° and 60° from the driving speed of the rotor.

In other words, as shown in the following equation 10, the position signal calculator 260 calculates the rotor speed $\omega_\gamma(t_0)$ for constant time before 0°. Then, supposing that the rotor is constantly rotated from 0° to 60°, the rotor position $\hat{\theta}_\gamma(t)$ is calculated.

[equation 10]

$$\hat{\theta}_\gamma(t) = \int_{t_0}^{t} \omega_\gamma(t_0) d\tau, \quad t_0 < \tau < t_0 + \frac{60°}{\omega_\gamma(t_0)}$$

When the rotor position is 60°, the position signal calculator 260 detects the rotor position information. Therefore, the detailed position from 60° to 120° is calculated in the same manner by correcting the position calculated from the rotor speed to the detected position information.

Second Embodiment

Figure 10:
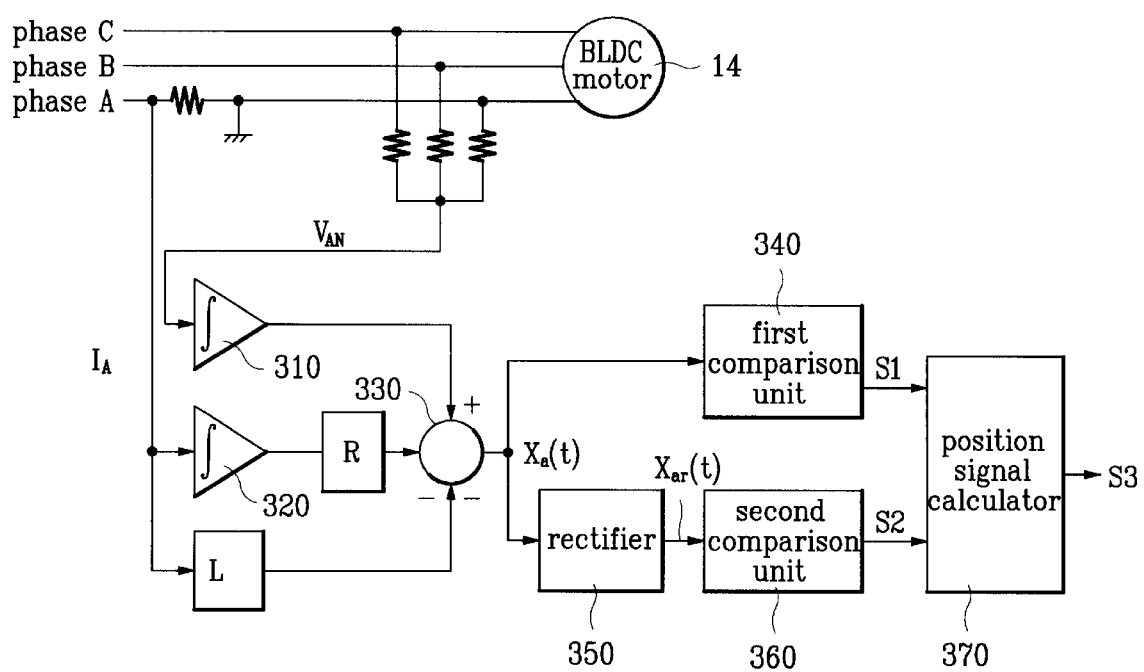
FIG. 10 shows a rotor position detector of a BLDC motor according to the second embodiment of the present invention.

As shown in FIG. 10, an apparatus for detecting a rotor position in a BLDC motor according to the second embodiment of the present invention includes a first integrator 310 for integrating a voltage for virtual neutral points of three phases, a second integrator 320 for integrating current of one phase among the three phases, an operation unit 330 for mixing a signal output from the first integrator, an operation signal of a signal output from the second integrator and a proportional coefficient R, and an operation signal of a proportional coefficient L and current of the one phase, a first comparison unit 340 for comparing the signal of the one phase output from the operation unit 330 with a predetermined first reference value, a rectifier 350 for rectifying the signal of the one phase output from the operation unit 330, a second comparison unit 250 for comparing the signal of the one phase rectified by the rectifier 350 with a predetermined second reference value, and a position signal calculator 370 for calculating a position signal by operating signals output from the first and second comparison units 340 and 360.

Figure 11A:
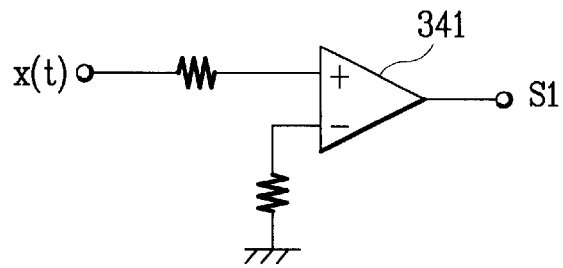
FIGS. 11a to 11c show detailed configurations of a first comparison unit, a second comparison unit and a position signal calculator of FIG. 10.
Figure 11B:
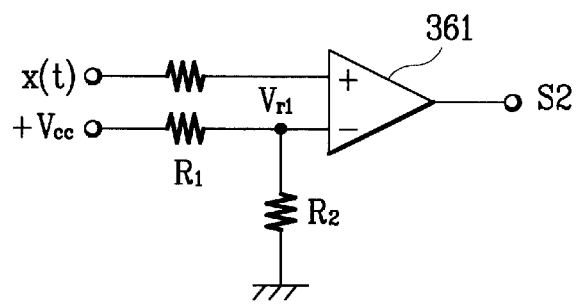
Figure 11C:
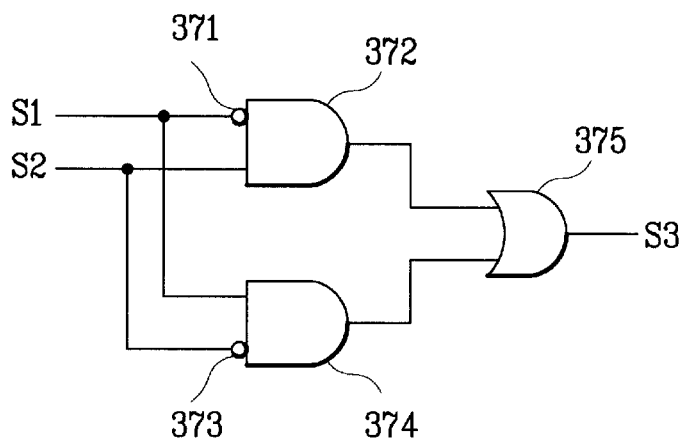

As shown in FIG. 11a, the first comparison unit 340 includes a first comparator 341 for comparing the signal of the one phase output from the operation unit 330 with the predetermined first reference value. The second comparison unit 360 includes a second comparator 361 for comparing the signal of the one phase rectified by the rectifier 350 with the predetermined second reference value. Also, as shown in FIG. 11c, the position signal calculator 370 includes a first inverter for inverting the signal output from the first comparator 341, a first AND gate 372 for performing logic AND operation of a signal inverted by the first inverter 371 and a signal output from the second comparator 361, a second inverter 373 for inverting the signal output from the second comparator 361, a second AND gate 374 for performing logic AND operation of a signal output from the first comparator 341 and a signal inverted by the second inverter 373, and an OR gate 375 for performing logic OR operation of signals output from the first and second AND gates 372 and 374.

In the aforementioned embodiment of the present invention, the rotor position is detected by only a voltage of any one among the three phases A, B and C. For example, a model equation of the phase A can be expressed by the equation 6. From the equation 6, the voltage $e_a$ is obtained, and then information of the phase A which is variable depending on the position regardless of speed can be obtained by integrating the voltage $e_a$ as shown in the equation 7.

The first integrator 310 integrates the current of one phase for the virtual neutral point and outputs the resultant signal.

The second integrator 320 integrates the current of the one phase and outputs the resultant signal.

Figure 13:
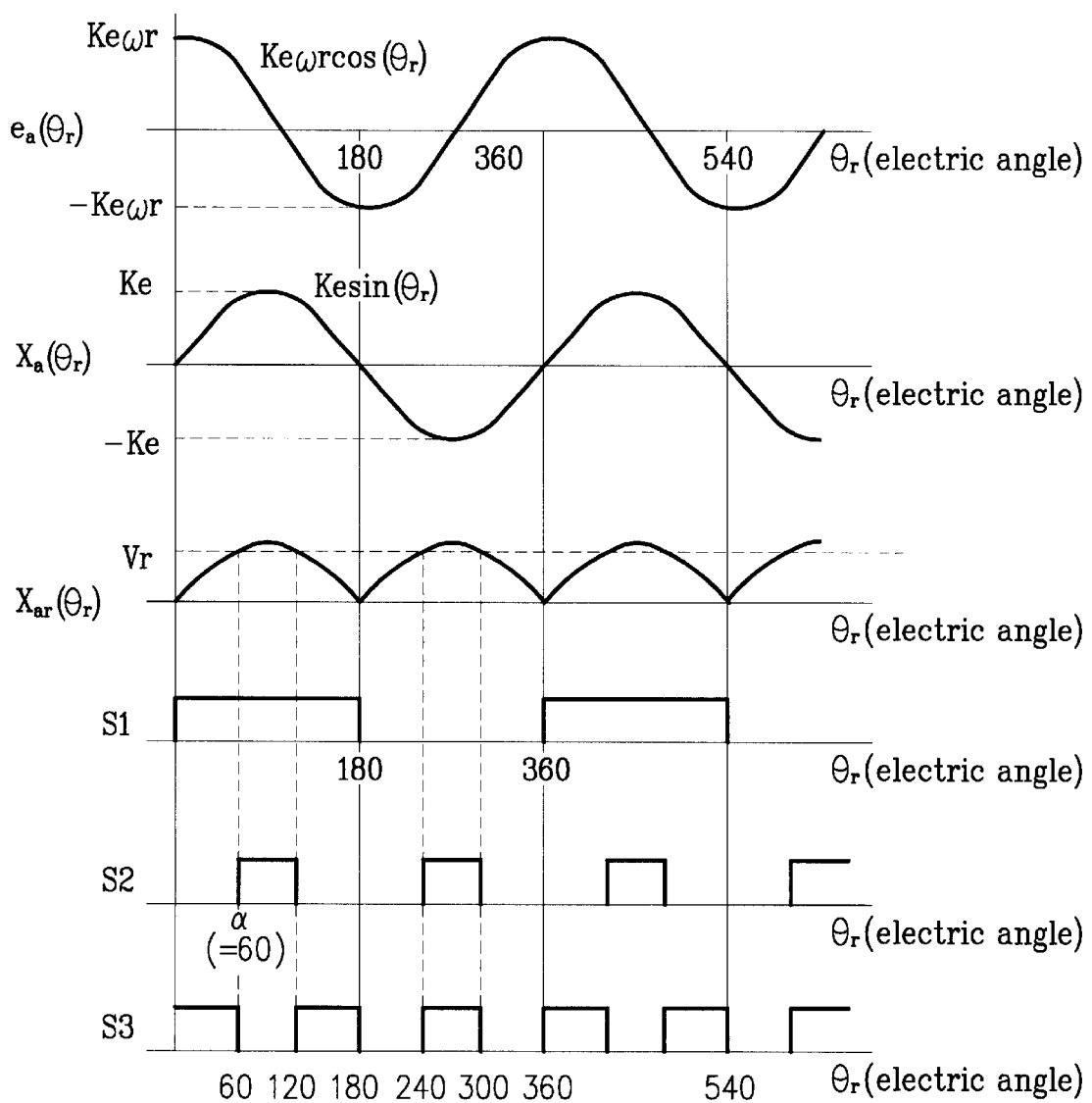
FIG. 13 shows position detecting waveforms in view of 60° of FIG. 10.

The operation unit 330 mixes the signal output from the first integrator, the operation signal of the signal output from the second integrator and the proportional coefficient R, and the operation signal of the proportional coefficient L and current of the one phase. Then, as shown in FIG. 13, the operation unit 330 outputs $k_e \sin(\theta_\gamma)$.

Figure 12:
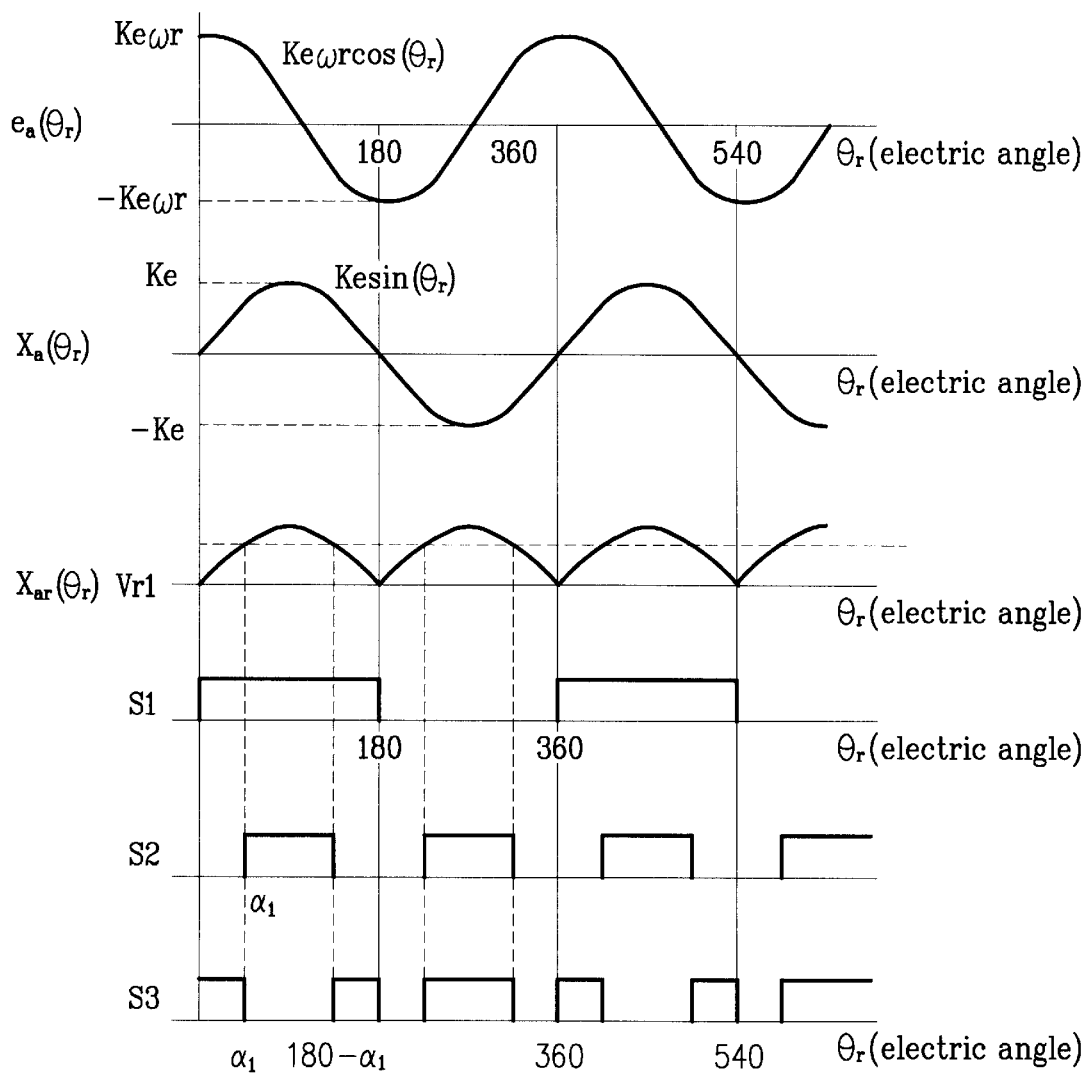
FIG. 12 shows position detecting waveforms in any angle of FIG. 10.

The first comparison unit 340 compares the signal of the one phase output from the operation unit 330 with the first reference value and outputs the resultant signal S1 shown in FIG. 12. That is to say, the first comparator 341 of the first comparison unit 340 compares the signal of the one phase output from the operation unit 330 with the first reference value of the zero potential predetermined by a pull-up resistor. Then, the first compartor 341 outputs the resultant signal S1.

Moreover, the rectifier 350 rectifies the signal of the one phase output from the operation unit 330.

Then, the second comparison unit 360 compares the signal of the one phase rectified by the rectifier 350 with the second reference value. Then, the second comparison unit 360 outputs the resultant signal S2 as shown in FIG. 12. That is to say, the second comparator 361 of the second comparison unit 360 compares the signal of the one phase output from the operation unit 330 with the second reference value predetermined by voltage division of resistors R1 and R2. Then, the second compartor 361 outputs the resultant signal S2.

If the second reference value is $V_{\gamma 1}$, a cross angle $\alpha_1$ is obtained as the following equation 11 and the reference value $V_{\gamma 1}$ should be smaller than the constant $k_e$ of the voltage.

[equation 11]

$$\alpha_1 = \sin^{-1}\left(\frac{V_{\gamma 1}}{K_e}\right)$$

If the reference voltage value of the second comparison unit 360 is $V_{\gamma 1}$, six position data can electrically be obtained for one period (electric angle 360°).

In other words, the output of the first comparison unit 340, the signal S1 of 0° and 180°, and the outputs of the second comparison unit 360, the signal S2 of $\alpha_1$, 180−$\alpha_1$, 180+$\alpha_2$ and 360−$\alpha_1$ are available. The speed of the BLDC motor 14 can be controlled by various PWM methods by selecting $\alpha_1$.

Meanwhile, in practical application, to facilitate uniform position information detection and PWM control algorithm depending on the rotor position, it is necessary to adjust the reference voltage of the second comparison unit 360.

In other words, supposing that $V_{\gamma 1}=V_{\gamma}=\sqrt{3}k_e/2$, the cross angle $\alpha$ among the integrated value $x_a(t)$ of the voltage and the reference voltage $V_{\gamma 1}$ of the second comparison unit 360 can be expressed by the equation 9.

In this case, the position signal calculator 370 operates the signals output from the first and second comparison units 340 and 360 and calculates the position signal so as to output the resultant signal S3.

In other words, the first inverter 371 of the position signal calculator 370 inverts the signal output from the first comparator 340. Then, the first AND gate 372 performs logic AND operation of the signal inverted by the inverter 371 and the signal output from the second comparison unit 360, and outputs the resultant signal. Moreover, the second inverter 373 inverts the signal output from the second comparison unit 360. Then, the second AND gate 374 performs logic AND operation of the signal output from the first comparator 340 and a signal inverted by the second inverter 373, and outputs the resultant signal. Thus, the OR gate 375 performs logic OR operation of the signals output from the first and second AND gates 372 and 374, and outputs the resultant signal S3 as shown in FIG. 13.

Furthermore, the position signal calculator 370 detects the rotor position signal applied to the BLDC motor 14 for each unit of 60°. Based on the rotor position information detected for each unit of 60°, various PWM methods for driving the phase current of the BLDC motor with a sinusoidal wave may be provided in the same manner as the first embodiment.

Meanwhile, the rectifier 350 may be provided to rectify the output signal of the operation unit 330 and output the rectified signal to the first and second comparators 340 and 360.

Third Embodiment

Figure 14:
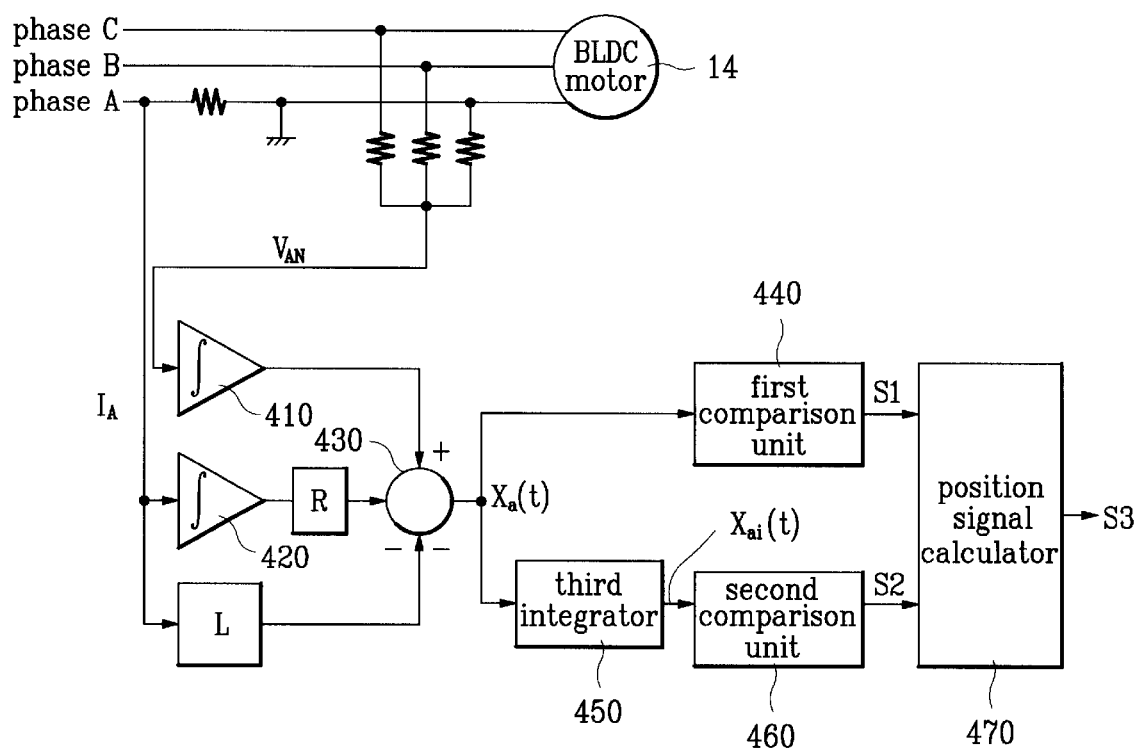
FIG. 14 shows a rotor position detector of a BLDC motor according to the third embodiment of the present invention.

As shown in FIG. 14, an apparatus for detecting a rotor position in a BLDC motor according to the third embodiment of the present invention includes a first integrator 410 for integrating a voltage for a virtual neutral point, a second integrator 420 for integrating current of one phase, an operation unit 430 for mixing a signal output from the first integrator, an operation signal of a signal output from the second integrator and a proportional coefficient R, and an operation signal of a proportional coefficient L and current of the one phase, a first comparison unit 440 for comparing the signal of the one phase output from the operation unit 430 with a predetermined first reference value, a third integrator 450 for integrating the signal of the one phase output from the operation unit 430, a second comparison unit 460 for comparing the signal of the one phase integrated by the third integrator 450 with a predetermined second reference value, and a position signal calculator 470 for calculating a position signal by operating signals output from the first and second comparison units 440 and 460.

Figure 15A:
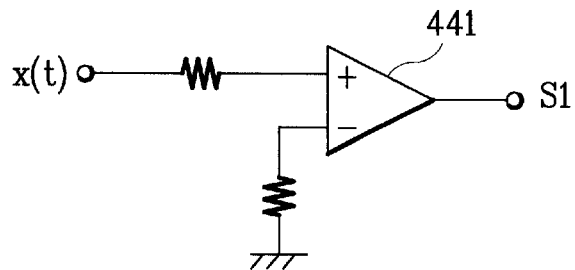
FIGS. 15a to 15c show detailed configurations of a first comparison unit, a second comparison unit and a position signal calculator of FIG. 14.
Figure 15B:
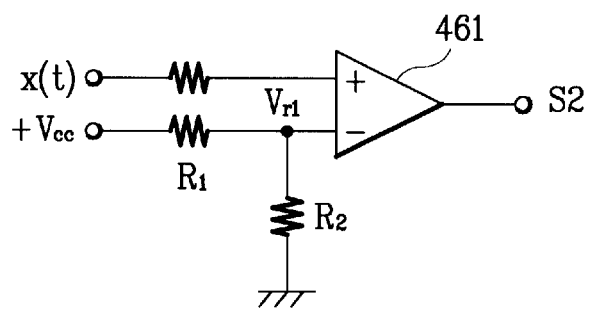
Figure 15C:
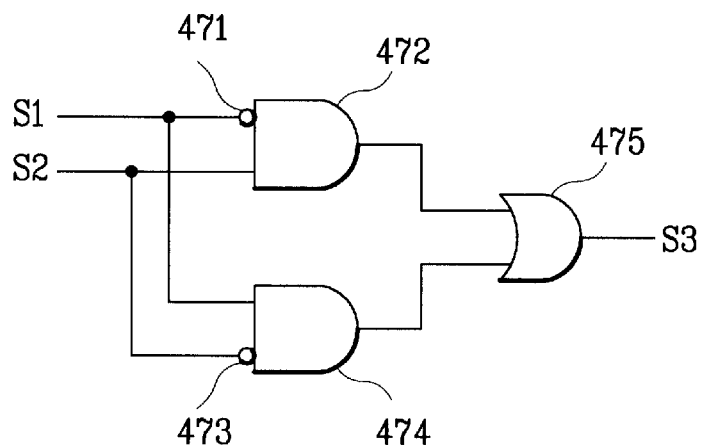

As shown in FIG. 15*a*, the first comparison unit 440 includes a first comparator 441 for comparing the signal of the one phase output from the operation unit 430 with the predetermined first reference value. As shown in FIG. 15*b*, the second comparison unit 460 includes a second comparator 461 for comparing the signal of the one phase integrated by the third integrator 450 with the predetermined second reference value. Also, as shown in FIG. 15*c*, the position signal calculator 470 includes a first inverter 471 for inverting the signal output from the first comparator 441, a first AND gate 472 for performing logic AND operation of a signal inverted by the first inverter 471 and a signal output from the second comparator 461, a second inverter 473 for inverting a signal output from the second comparator 461, a second AND gate 374 for performing logic AND operation of a signal output from the first comparator 441 and a signal inverted by the second inverter 473, and an OR gate 475 for performing logic OR operation of signals output from the first and second AND gates 472 and 474.

In the aforementioned embodiment of the present invention, the rotor position is detected by only a voltage of any one among the three phases A, B and C. For example, a model equation of the phase A can be expressed by the equation 6. From the equation 6, the voltage $e_a$ is obtained, and then information of the phase A which is variable depending on the position regardless of speed can be obtained by integrating the voltage $e_a$ as shown in the equation 7.

As shown in FIG. 18, the first integrator 410 integrates the voltage for the virtual neutral point and outputs the resultant signal.

The second integrator 420 integrates the current of the one phase and outputs the resultant signal.

The operation unit 430 mixes the signal output from the first integrator, the operation signal of the proportional coefficient R, and the operation signal of the proportional coefficient L and current of the one phase. Then, as shown in FIG. 16, the operation unit 430 outputs $k_e \sin(\theta_\gamma)$.

Figure 16:
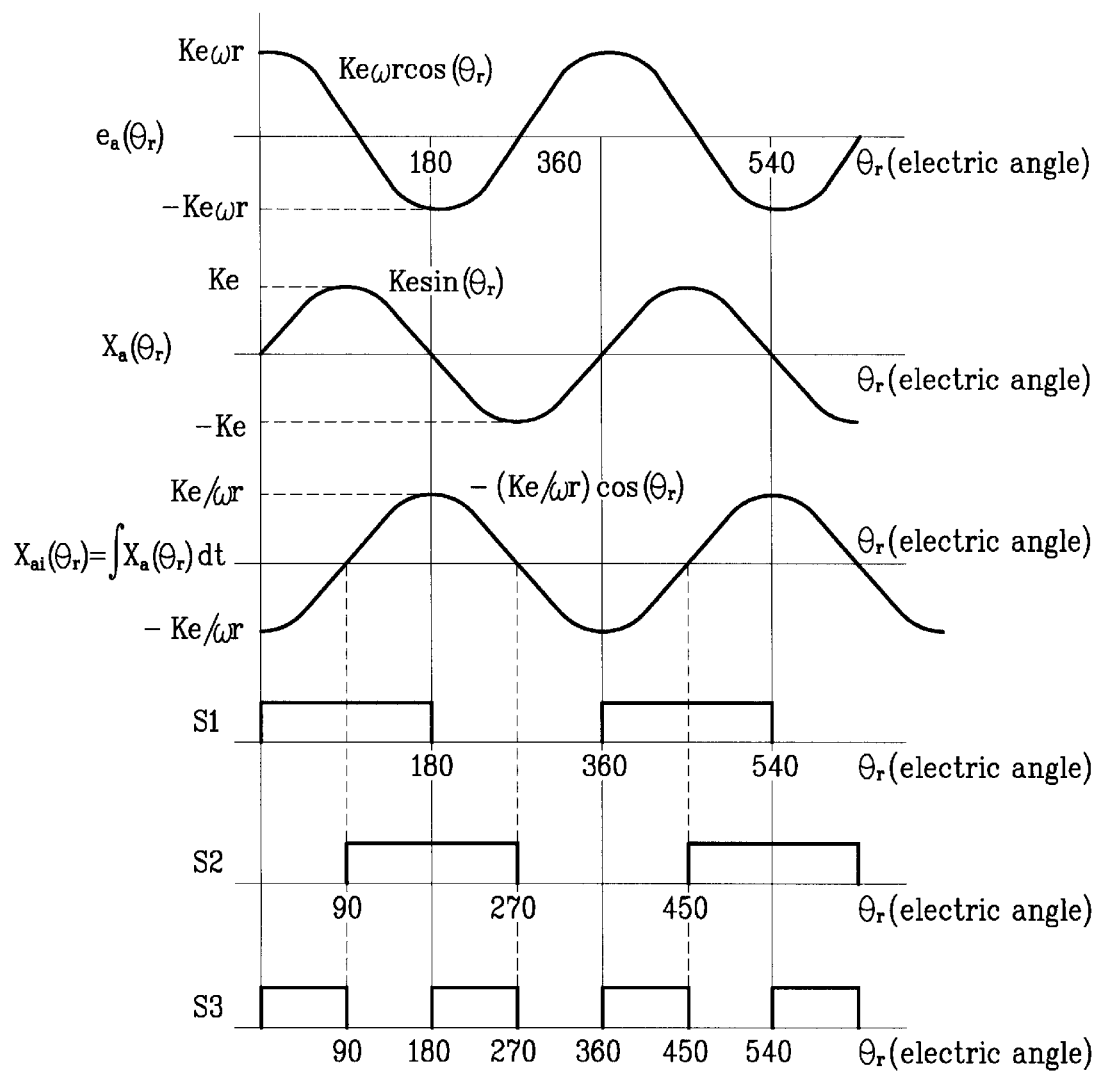
FIG. 16 shows position detecting waveforms of FIG. 14.

The first comparison unit 440 compares the signal of the one phase output from the operation unit 430 with the first reference value and outputs the resultant signal S1 shown in FIG. 16. That is to say, the first comparator 441 of the first comparison unit 440 compares the signal of the one phase output from the operation unit 430 with the first reference value of the zero potential predetermined by a pull-up resistor. Then, the first compartor 441 outputs the resultant signal S1.

The resultant signal S1 is position data of 180° interval, such as 0°, 180° and 360°.

Then, the second comparison unit 460 compares the signal of the one phase integrated by the third integrator 450 with the second reference value. Then, the second comparison unit 460 outputs the resultant signal S2 as shown in FIG. 16. That is to say, the second comparator 471 of the second comparison unit 460 compares the signal of the one phase output from the operation unit 430 with the second reference value predetermined by voltage division of resistors R1 and R2. Then, the second compartor 471 outputs the resultant signal S2. The resultant signal S2 is position data of 90° and 270°.

Here, if $x_a(t)$ of the equation 7 is integrated, as shown in the following equation 12, the integrated value $x_{ai}(t)$ has waveforms behind $x_a(t)$ by electric angle 90°. Thus, information of electric angles 90° and 270° can be obtained. If the second reference value is $V_{\gamma 1}$, a cross angle $\alpha_1$ is obtained as the following equation 11 and the reference value $V_{\gamma 1}$ should be smaller than the constant $k_e$ of the voltage.

[equation 12]

$$x_{ai}(t) = \int x_a(t)dt$$
$$= -\frac{k_e}{\omega_\gamma} \cos(\theta_\gamma)$$

Here, $x_{ai}(t)$ is a function of the speed $\omega_\gamma$ of the BLDC motor 14. Therefore, if the speed of the BLDC motor 14 is lower than a reference speed, $x_{ai}(t)$ is not integrated. $x_{ai}(t)$ is integrated only if the speed of the BLDC motor 14 is higher than the reference speed. As a result, reliability of the integrated result can be achieved.

If the reference voltage value of the second comparison unit 460 is $V_{\gamma 1}$, four position data can electrically be obtained for one period (electric angle 360°).

In other words, the output of the first comparison unit 440, the signal S1 of 0° and 180°, and the outputs of the second comparison unit 460, the signal S2 of 90° and 270° are available. Since the rotor position data is corrected and supplemented for each unit of 90°, the speed of the BLDC motor 14 can be controlled by a sinusoidal wave current driving method based on a proper PWM method.

In this case, the position signal calculator 470 operates the signals output from the first and second comparison units 440 and 460 and calculates the position signal so as to output the resultant signal S3.

In other words, the first inverter 471 of the position signal calculator 470 inverts the signal output from the first comparator 440. Then, the first AND gate 472 performs logic AND operation of the signal inverted by the inverter 471 and the signal output from the second comparison unit 460, and outputs the resultant signal. Moreover, the second inverter 473 inverts the signal output from the second comparison unit 460. Then, the second AND gate 474 performs logic AND operation of the signal output from the first comparator 440 and a signal inverted by the second inverter 473, and outputs the resultant signal. Thus, the OR gate 475 performs logic OR operation of the signals output from the first and second AND gates 472 and 474, and outputs the resultant signal S3 as shown in FIG. 16.

In other words, to control the current of the phase A with the sinusoidal wave, a reference voltage of the phase A during one period (360°) is compared with a triangular wave. Thus, a transistor on/off signal of the inverter 7 corresponding to the phase A is calculated in advance depending on the rotor position and stored in a look-up table, so as to generate a PWM signal. Alternatively, the PWM signal may be generated by directly calculating the transistor on/off signal from the brief equation of the PWM signal depending on the rotor position for a reference torque.

However, as shown in FIG. 16, although the position signal calculator 470 can detect the rotor position for each unit of 90° but cannot detect the rotor position within 90°. However, as shown in FIG. 16, since position information between 0° and 90° is required to generate the actual PWM signal, the position signal calculator 470 approximately calculates a position angle between 0° and 90° from the driving speed of the rotor.

In other words, as shown in the following equation 13, the position signal calculator 470 calculates the rotor speed $\omega_\gamma(t_0)$ for constant time before 0°. Then, supposing that the rotor is constantly rotated from 0° to 90°, the rotor position $\hat{\theta}_\gamma(t)$ is calculated.

[equation 13]

$$\hat{\theta}_\gamma(t) = \int_{t_0}^{\tau} \omega_\gamma(t_0)d\tau, \quad t_0 < \tau < t_0 + \frac{90°}{\omega_\gamma(t_0)}$$

When the rotor position is 90°, the position signal calculator 470 detects the rotor position information. Therefore, the detailed position from 90° to 180° is calculated in the same manner by correcting the position calculated from the rotor speed to the detected position information.

As aforementioned, the apparatus for detecting a rotor position of a BLDC motor according to the present invention has the following advantages.

Since the rotor position is detected by the voltage for the virtual neutral point and the current of one phase, the number of circuit parts required for position detection can be reduced, thereby saving the production cost. Furthermore, a compact circuit can be provided by reducing an area occupied by a position detecting circuit.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. An apparatus for detecting a rotor position in a brushless direct current (BLDC) motor comprising:
    a first integrator for integrating a signal input through a virtual neutral point of power supply lines of three phases connected to the BLDC motor;
    a second integrator for integrating a signal input to the power supply line of one phase among the power supply lines of the three phases;
    an operation unit for mixing a signal output from the first integrator, an operation signal of a signal output from the second integrator and a proportional coefficient R, and an operation signal of a proportional coefficient L and current of the one phase;
    a first comparison unit for comparing a signal of the one phase output from the operation unit with a predetermined first reference value;
    a second comparison unit for comparing the signal of the one phase output from the operation unit with predetermined second and third reference values; and
    a position signal calculator for calculating a position signal by operating signals output from the first and second comparison units.

2. The apparatus as claimed in claim 1, wherein the first comparison unit includes a first comparator for comparing the signal of the one phase output from the operation unit with the predetermined first reference value.

3. The apparatus as claimed in claim 2, wherein the first reference value is zero potential set by a pull-down resistor.

4. The apparatus as claimed in claim 1, wherein the second comparison unit includes a second comparator for comparing the signal of the one phase output from the operation unit with the predetermined second reference value, and a third comparator for comparing the signal of the one phase output from the operation unit with the predetermined third reference value.

5. The apparatus as claimed in claim 4, wherein the second and third reference values are respectively set by voltage division.

6. The apparatus as claimed in claim 1, wherein the position signal calculator includes an AND gate for performing logic AND operation of a signal output from the first comparison unit and a signal output from the second comparison unit, and an OR gate for performing logic OR operation of a signal output from the AND gate and a signal output from the second comparison unit.

7. An apparatus for detecting a rotor position in a brushless direct current (BLDC) motor comprising:
   a first integrator for integrating a signal input through a virtual neutral point of power supply lines of three phases connected to the BLDC motor;
   a second integrator for integrating a signal input to the power supply line of one phase among the three phases applied to the BLDC motor;
   an operation unit for mixing a signal output from the first integrator, an operation signal of a signal output from the second integrator and a proportional coefficient R, and an operation signal of a proportional coefficient L and current of the one phase;
   a first comparison unit for comparing the signal of the one phase output from the operation unit with a predetermined first reference value;
   a rectifier for rectifying the signal of the one phase output from the operation unit;
   a second comparison unit for comparing the signal of the one phase rectified by the rectifier with a predetermined second reference value; and
   a position signal calculator for calculating a position signal by operating signals output from the first and second comparison units.

8. The apparatus as claimed in claim 7, wherein the first comparison unit includes a first comparator for comparing the signal of the one phase output from the operation unit with the predetermined first reference value.

9. The apparatus as claimed in claim 8, wherein the first reference value is zero potential set by a pull-down resistor.

10. The apparatus as claimed in claim 7, wherein the second comparison unit includes a second comparator for comparing the signal of the one phase rectified by the rectifier with the predetermined second reference value.

11. The apparatus as claimed in claim 10, wherein the second reference value is set by voltage division.

12. The apparatus as claimed in claim 7, wherein the position signal calculator includes a first inverter for inverting the signal output from the first comparison unit, a first AND gate for performing logic AND operation of a signal inverted by the first inverter and a signal output from the second comparison unit, a second inverter for inverting the signal output from the second comparison unit, a second AND gate for performing logic AND operation of a signal output from the first comparison unit and a signal inverted by the second inverter, and an OR gate for performing logic OR operation of signals output from the first and second AND gates.

13. An apparatus for detecting a rotor position in a brushless direct current (BLDC) motor comprising:
   a first integrator for integrating a signal input through a virtual neutral point of power supply lines of three phases connected to the BLDC motor;
   a second integrator for integrating a signal input to the power supply line of one phase among the three phases applied to the BLDC motor;
   an operation unit for mixing a signal output from the first integrator, an operation signal of a signal output from the second integrator and a proportional coefficient R, and an operation signal of a proportional coefficient L and current of the one phase;
   a rectifier for rectifying the signal of the one phase output from the operation unit;
   a first comparison unit for comparing a signal output from the rectifier with a predetermined first reference value;
   a second comparison unit for comparing the signal of the one phase rectified by the rectifier with a predetermined second reference value; and
   a position signal calculator for calculating a position signal by operating signals output from the first and second comparison units.

14. The apparatus as claimed in claim 13, wherein the first comparison unit includes a first comparator for comparing the signal of the one phase output from the operation unit with the predetermined first reference value.

15. The apparatus as claimed in claim 14, wherein the first reference value is zero potential set by a pull-down resistor.

16. The apparatus as claimed in claim 13, wherein the second comparison unit includes a second comparator for comparing the signal of the one phase rectified by the rectifier with the predetermined second reference value.

17. The apparatus as claimed in claim 16, wherein the second reference value is set by voltage division.

18. The apparatus as claimed in claim 13, wherein the position signal calculator includes a first inverter for inverting the signal output from the first comparison unit, a first AND gate for performing logic AND operation of a signal inverted by the first inverter and a signal output from the second comparison unit, a second inverter for inverting the signal output from the second comparison unit, a second AND gate for performing logic AND operation of a signal output from the first comparison unit and a signal inverted by the second inverter, and an OR gate for performing logic OR operation of signals output from the first and second AND gates.

19. An apparatus for detecting a rotor position in a brushless direct current (BLDC) motor comprising:
   a first integrator for integrating a signal input through a virtual neutral point of power supply lines of three phases connected to the BLDC motor;
   a second integrator for integrating a signal input to the power supply line of one phase among the three phases applied to the BLDC motor;
   an operation unit for mixing a signal output from the first integrator, an operation signal of a signal output from the second integrator and a proportional coefficient R, and an operation signal of a proportional coefficient L and current of the one phase;
   a first comparison unit for comparing a signal of the one phase output from the operation unit with a predetermined first reference value;
   a third integrator for integrating the signal of the one phase output from the operation unit;
   a second comparison unit for comparing the signal of the one phase integrated by the third integrator with a predetermined second reference value; and a position signal calculator for calculating a position signal by operating signals output from the first and second comparison units.

20. The apparatus as claimed in claim 19, wherein the first comparison unit includes a first comparator for comparing the signal of the one phase output from the operation unit with the predetermined first reference value.

21. The apparatus as claimed in claim 20, wherein the first reference value is zero potential set by a pull-down resistor.

22. The apparatus as claimed in claim 19, wherein the second comparison unit includes a second comparator for comparing the signal of the one phase integrated by the third integrator with the predetermined second reference value.

23. The apparatus as claimed in claim 22, wherein the second reference value is set by voltage division.

24. The apparatus as claimed in claim 19, wherein the position signal calculator includes a first inverter for inverting the signal output from the first comparison unit, a first AND gate for performing logic AND operation of a signal inverted by the first inverter and a signal output from the second comparison unit, a second inverter for inverting the signal output from the second comparison unit, a second AND gate for performing logic AND operation of a signal output from the first comparison unit and a signal inverted by the second inverter, and an OR gate for performing logic OR operation of signals output from the first and second AND gates.

* * * * *